(12) United States Patent
Witkowski et al.

(10) Patent No.: US 11,470,063 B2
(45) Date of Patent: Oct. 11, 2022

(54) VEHICLE CONFIGURABLE TRANSMITTER FOR ALLOWING CLOUD-BASED TRANSFER OF DATA BETWEEN VEHICLES

(71) Applicant: Gentex Corporation, Zeeland, MI (US)

(72) Inventors: Todd R. Witkowski, Zeeland, MI (US); Steven L. Willard, II, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 324 days.

(21) Appl. No.: 16/542,398

(22) Filed: Aug. 16, 2019

(65) Prior Publication Data

US 2020/0059456 A1 Feb. 20, 2020

Related U.S. Application Data

(60) Provisional application No. 62/719,206, filed on Aug. 17, 2018.

(51) Int. Cl.
*H04L 9/40* (2022.01)
*H04W 4/46* (2018.01)
(Continued)

(52) U.S. Cl.
CPC ........ *H04L 63/0464* (2013.01); *H04L 9/0894* (2013.01); *H04W 4/46* (2018.02);
(Continued)

(58) Field of Classification Search
CPC .............. H04L 63/0464; H04L 9/0894; H04L 2209/84; H04L 2209/80; H04W 12/033; H04W 4/46
See application file for complete search history.

(56) References Cited

U.S. PATENT DOCUMENTS 5,442,340 A 8/1995 Dykema
5,479,155 A 12/1995 Zeinstra et al.
(Continued)

FOREIGN PATENT DOCUMENTS

RU 2214065 10/2003
RU 2402074 10/2010
(Continued)

*Primary Examiner* — Taghi T Arani
*Assistant Examiner* — Blake I Narramore
(74) *Attorney, Agent, or Firm* — Price Heneveld LLP; Brian James Brewer (57) ABSTRACT

A configurable transmitter is provided for a vehicle for transmitting signals to a device remote from the vehicle. The configurable transmitter includes an RF transmitter that receives an RF signal during a training mode to learn characteristics of the received RF signal, and to transmit an RF signal to the remote device in an operating mode where the transmitted RF signal includes the learned characteristics of the received RF signal; a local memory device for storing channel data representing the learned characteristics and for storing a unique identification code and a cloud encryption key; an interface that communicates with an Internet server; and a controller coupled to the local memory device and the interface, the controller retrieves the channel data from the local memory device, encrypts the channel data using the cloud encryption key and transfers the encrypted channel data for remote storage in the Internet server through the interface.

17 Claims, 4 Drawing Sheets

(51) Int. Cl.
*H04L 9/08* (2006.01)
*H04W 12/033* (2021.01)

(52) U.S. Cl.
CPC ....... *H04W 12/033* (2021.01); *H04L 2209/80* (2013.01); *H04L 2209/84* (2013.01)

(56) References Cited

U.S. PATENT DOCUMENTS

| | | |
|---|---|---|
| 5,583,485 A | 12/1996 | Van Lente et al. |
| 5,614,891 A | 3/1997 | Zeinstra et al. |
| 5,619,190 A | 4/1997 | Duckworth et al. |
| 5,627,529 A | 5/1997 | Duckworth et al. |
| 5,646,701 A | 7/1997 | Duckworth et al. |
| 5,661,651 A | 8/1997 | Geschke et al. |
| 5,661,804 A | 8/1997 | Dykema et al. |
| 5,668,880 A | 9/1997 | Alajajian |
| 5,686,903 A | 11/1997 | Duckworth et al. |
| 5,699,054 A | 12/1997 | Duckworth |
| 5,699,055 A | 12/1997 | Dykema et al. |
| 5,793,300 A | 8/1998 | Suman et al. |
| 5,854,593 A | 12/1998 | Dykema et al. |
| 5,903,226 A | 5/1999 | Suman et al. |
| 5,940,000 A | 8/1999 | Dykema |
| 6,028,537 A | 2/2000 | Suman et al. |
| 6,091,343 A | 7/2000 | Dykema et al. |
| 6,965,757 B2 | 11/2005 | Eray |
| 6,978,126 B1 | 12/2005 | Blaker et al. |
| 7,197,278 B2 | 3/2007 | Harwood et al. |
| 7,266,204 B2 | 9/2007 | Watson et al. |
| 7,469,129 B2 | 12/2008 | Blaker et al. |
| 7,532,965 B2 | 5/2009 | Robillard et al. |
| 7,778,604 B2 | 8/2010 | Bauman et al. |
| 7,786,843 B2 | 8/2010 | Witkowski |
| 7,864,070 B2 | 1/2011 | Witkowski et al. |
| 7,889,050 B2 | 2/2011 | Witkowski |
| 7,911,358 B2 | 3/2011 | Bos et al. |
| 7,970,446 B2 | 6/2011 | Witkowski et al. |
| 3,000,667 A1 | 8/2011 | Witkowski et al. |
| 8,049,595 B2 | 11/2011 | Olson et al. |
| 8,174,357 B2 | 5/2012 | Geerlings et al. |
| 8,165,527 B2 | 8/2012 | Sims et al. |
| 8,253,528 B2 | 8/2012 | Blaker |
| 8,264,333 B2 | 9/2012 | Blaker et al. |
| 8,384,580 B2 | 2/2013 | Witkowski |
| 8,494,449 B2 | 7/2013 | Witkowski |
| 8,531,266 B2 | 9/2013 | Shearer et al. |
| 8,643,481 B2 | 2/2014 | Campbell et al. |
| 8,760,267 B2 | 6/2014 | Bos et al. |
| 9,137,222 B2 | 9/2015 | Haeger et al. |
| 10,242,217 B1* | 3/2019 | Leavy ................ H04L 63/0435 |
| 2002/0044065 A1 | 4/2002 | Quist et al. |
| 2005/0046545 A1 | 3/2005 | Skekloff et al. |
| 2005/0225457 A1* | 10/2005 | Kagawa ................ G08G 1/0965 |
| | | 340/995.13 |
| 2006/0126197 A1 | 6/2006 | Drummond et al. |
| 2006/0226949 A1* | 10/2006 | Reene ................... G08C 19/28 |
| | | 340/5.25 |
| 2006/0232376 A1* | 10/2006 | Blaker ................. H04L 9/3226 |
| | | 340/5.71 |
| 2006/0280297 A1* | 12/2006 | Fukaya ................ H04L 9/0844 |
| | | 380/28 |
| 2006/0288300 A1* | 12/2006 | Chambers .............. H04N 7/163 |
| | | 715/744 |
| 2007/0060079 A1 | 3/2007 | Nakagawa et al. |
| 2007/0167138 A1 | 7/2007 | Bauman et al. |
| 2008/0062000 A1 | 3/2008 | Styers et al. |
| 2008/0068205 A1* | 3/2008 | Witkowski ......... G07C 9/00182 |
| | | 340/5.71 |
| 2009/0021348 A1 | 1/2009 | Farris et al. |
| 2009/0315751 A1 | 12/2009 | Bennie et al. |
| 2010/0171588 A1 | 7/2010 | Chutorash et al. |
| 2010/0210220 A1 | 8/2010 | Chutorash et al. |
| 2011/0018694 A1* | 1/2011 | Geerlings .............. G08C 17/02 |
| | | 340/12.28 |
| 2011/0025456 A1 | 2/2011 | Bos et al. |
| 2011/0112969 A1 | 5/2011 | Zaid et al. |
| 2011/0248866 A1 | 10/2011 | Chutorash et al. |
| 2013/0147616 A1 | 6/2013 | Lambert et al. |
| 2013/0151977 A1 | 6/2013 | Arteaga-King et al. |
| 2013/0279695 A1 | 10/2013 | Rubin et al. |
| 2014/0009263 A1 | 1/2014 | Shearer et al. |
| 2014/0111315 A1 | 4/2014 | Geerlings et al. |
| 2014/0118119 A1 | 5/2014 | Geerlings et al. |
| 2015/0279204 A1* | 10/2015 | Huang ................ H04L 12/2805 |
| | | 340/12.25 |
| 2015/0302730 A1 | 10/2015 | Geerlings et al. |
| 2015/0302738 A1 | 10/2015 | Geerlings et al. |
| 2017/0323498 A1* | 11/2017 | Bauer ................ G07C 9/00182 |
| 2017/0352200 A1 | 12/2017 | Wang et al. |
| 2018/0204399 A1* | 7/2018 | Newman ................ H04W 12/08 |
| 2019/0209022 A1 | 7/2019 | Sobol et al. |
| 2019/0260580 A1* | 8/2019 | Chu ..................... H03M 7/707 |

FOREIGN PATENT DOCUMENTS

| | | |
|---|---|---|
| WO | 2004077729 A2 | 9/2004 |
| WO | 2008079811 | 7/2008 |

* cited by examiner

VEHICLE CONFIGURABLE TRANSMITTER FOR ALLOWING CLOUD-BASED TRANSFER OF DATA BETWEEN VEHICLES

CROSS-REFERENCE TO RELATED APPLICATION

This application claims priority to and the benefit under 35 U.S.C. § 119(e) of U.S. Provisional Patent Application No. 62/719,206, filed on Aug. 17, 2018, entitled "VEHICLE TRAINABLE TRANSCEIVER FOR ALLOWING CLOUD-BASED TRANSFER OF DATA BETWEEN VEHICLES," by Todd R. Witkowski et al., the entire disclosure of which is incorporated herein by reference.

FIELD OF THE INVENTION

The present invention generally relates to configurable transmitters for vehicles, and more particularly, configurable transmitters for transmitting radio frequency (RF) signals to a device remote from the vehicle.

SUMMARY OF THE INVENTION

According to one aspect of the present invention, a method of transferring channel data from a first vehicle to a second vehicle is provided, where the channel data represents characteristics of an RF signal used to control a remote device, the method comprises: providing an Internet server configured to store unique transceiver identification codes and cloud encryption keys associated with each unique transceiver identification code; and providing a configurable transmitter in the first vehicle and a second configurable transmitter in the second vehicle. Each of the first and second configurable transmitters transmits RF signals to a remote device, and each configurable transmitter comprises: a local memory device in which a unique configurable transmitter identification code is stored along with a cloud encryption key, a controller coupled to the local memory device, the controller configured to store channel data in the local memory device, an RF transmitter configured to transmit the RF signal to the remote device in an operating mode where the transmitted RF signal includes the characteristics stored as channel data in the local memory device, and an interface through which communication with the Internet server is provided. The method further comprises: encrypting the channel data in the local memory device of the first configurable transmitter using the cloud encryption key stored in the local memory of the first configurable transmitter; transmitting the unique configurable transmitter identification code of the first configurable transmitter and the encrypted channel data to the Internet server; storing the encrypted channel data in the Internet server; transmitting from the second configurable transmitter a command to transfer the channel data stored in the Internet server along with the unique identification code of the second configurable transmitter; using the Internet server to look up an encryption key associated with the received unique identification code of the first configurable transmitter; decrypting the encrypted channel data stored in the Internet server using the encryption key associated with the unique identification code of the first configurable transmitter; using the Internet server to look up an encryption key associated with the received unique identification code of the second configurable transmitter; encrypting the channel data stored in the Internet server with the encryption key associated with the unique identification code of the second configurable transmitter; transmitting the encrypted channel data from the Internet server to the second configurable transmitter; and storing the received channel data in the local memory device of the second configurable transmitter.

According to another embodiment of the present invention, a configurable transmitter is provided for transmitting signals to a remote device, the configurable transmitter comprising: an RF transmitter configured to receive an RF signal during a training mode in order to learn characteristics of the received RF signal, and to transmit an RF signal to the remote device in an operating mode where the transmitted RF signal includes the learned characteristics of the received RF signal; a local memory device for storing channel data representing the learned characteristics of the received RF signal and for storing a unique identification code and a cloud encryption key; an interface configured to communicate with an Internet server; and a controller coupled to the local memory device and the interface, the controller configured to retrieve the channel data from the local memory device, to encrypt the channel data using the cloud encryption key, and to transfer the encrypted channel data for remote storage in the Internet server through the interface.

According to another embodiment of the present invention, a configurable transmitter is provided for transmitting signals to a remote device, the configurable transmitter comprising: a local memory device for storing a unique identification code and a cloud encryption key; an interface configured to communicate with an Internet server; a controller coupled to the local memory device and the interface, the controller configured to receive encrypted channel data from the Internet server through the interface, to decrypt the encrypted channel data using the cloud encryption key and to store the channel data in the local memory device, wherein the channel data represents characteristics of an RF signal to which the remote device is responsive; and an RF transmitter configured to transmit an RF signal to the remote device where the transmitted RF signal has the characteristics represented by the channel data.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The terms "including," "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element preceded by "comprises . . . a" does not, without more constraints, preclude the existence of additional identical elements in the process, method, article, or apparatus that comprises the element.

As noted above, the embodiments described below pertain to a configurable transmitter. A configurable transmitter may be a trainable RF transceiver, but does not necessarily have to include the components of a trainable RF transceiver that receive an RF signal from an original transmitter and learn the characteristics of that RF signal, but that instead are provided with some means to receive data representing the characteristics of an RF signal, or may instead be preloaded with various data formats and provide means for the user to select which format to use. Vehicle-installed trainable RF transceivers are known that are capable of learning characteristics of an RF signal transmitted by an original portable garage door opener transmitter that typically comes with a garage door opener (GDO). Once the trainable RF transceiver learns the characteristics, it may then transmit an RF signal having the characteristics to the GDO, which responds to the RF signal in the same manner as if transmitted from the original portable GDO transmitter. Examples of such known trainable RF transceivers are disclosed in commonly-assigned U.S. Pat. Nos. 5,442,340; 5,479,155; 5,583,485; 5,614,891; 5,619,190; 5,627,529; 5,646,701; 5,661,804; 5,686,903; 5,699,054; 5,699,055; 5,793,300; 5,854,593; 5,903,226; 5,940,000; 6,091,343; 6,965,757; 6,978,126; 7,469,129; 7,786,843; 7,864,070; 7,889,050; 7,911,358; 7,970,446; 8,000,667; 8,049,595; 8,165,527; 8,174,357; 8,531,266; 8,494,449; 8,384,580; 8,264,333; and 8,253,528, the entire disclosures of which are incorporated herein by reference. The trainable RF transceivers disclosed in these patents are sold commercially as HomeLink® trainable RF transceivers available from Gentex Corporation of Zeeland, Mich. Such trainable RF transceivers are capable of learning characteristics of the RF signal that include not only the RF carrier frequency, data code and modulation, but also any characteristics needed to learn and generate a rolling code. See the above-identified U.S. Pat. No. 5,661,804, for example. One recent trainable transceiver is further capable of communicating with remote devices including a GDO over the Internet. An example of such a trainable transceiver is disclosed in commonly-assigned United States Patent Application Publication No. 2015/0137941 A1, now U.S. Pat. No. 9,715,772, the entire disclosure of which is incorporated herein by reference.

To train the prior trainable transceivers, a user would typically press and hold one of the interface buttons until an indicator light would flash. At that time they would activate the original portable GDO transmitter such that the trainable transceiver would receive the RF signal transmitted from the GDO transmitter. If training was successful, the indicator light would flash at a different rate. Depending on the make and model of the GDO, however, other steps may be required such as pressing a button on the GDO itself. If training was not successful, the user would have to repeat the process. Further, for each additional remote device to be controlled by the trainable transceiver, an additional "channel" would need to be trained for each RF signal to be transmitted to the additional remote device(s). Moreover, if a vehicle owner were to either buy a new vehicle or drive a loaner vehicle while the owner's vehicle is being repaired, the user may repeat the training for some or all channels in the new or loaner vehicle. Further, if the vehicle owner owned two vehicles, the user would train each channel of the trainable transceiver in each vehicle.

Figure 1:
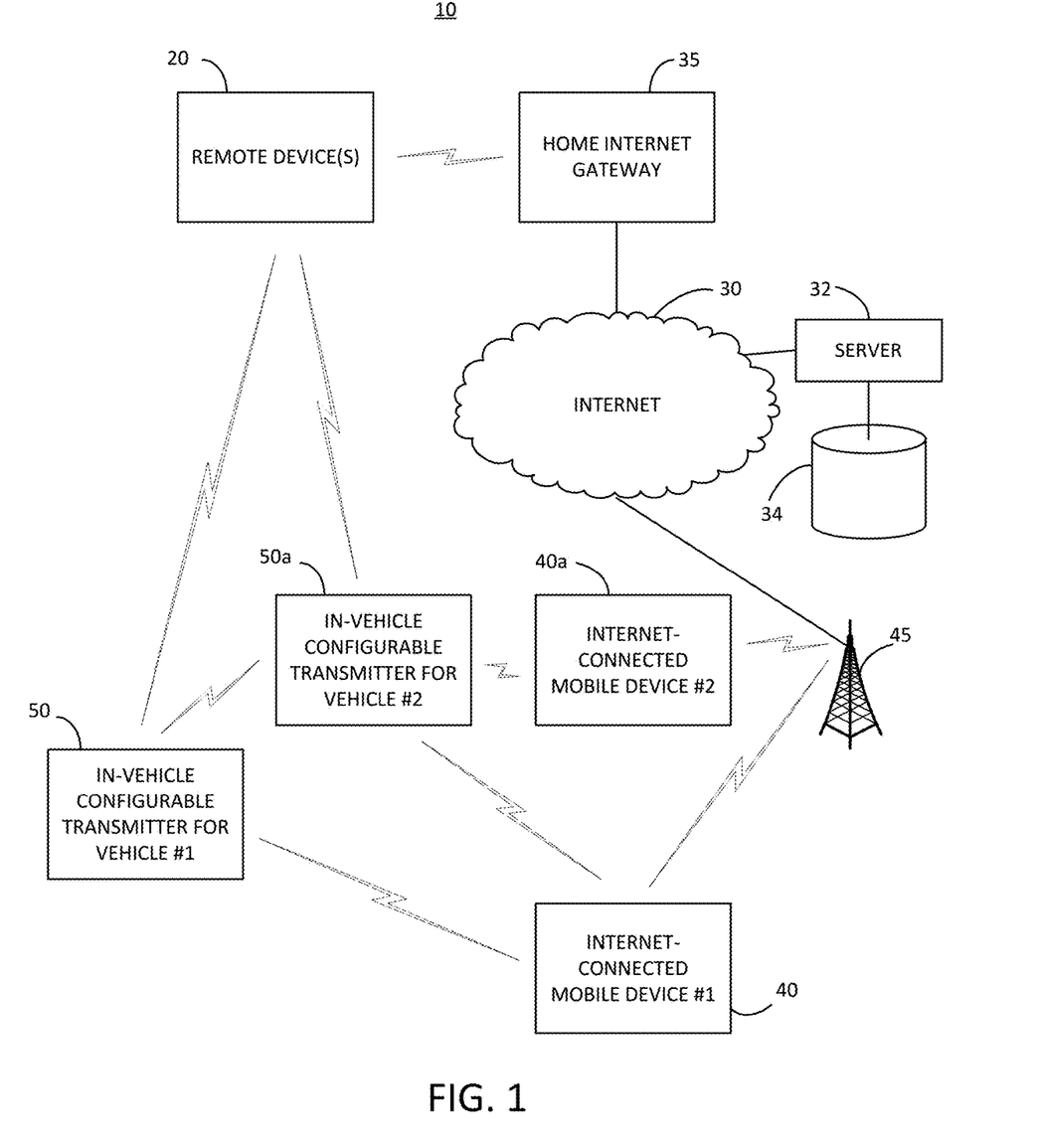
FIG. 1 is a block diagram showing an environment in which one or more configurable transmitter systems may be operated.

FIG. 1 shows an example of an environment 10 in which one or more vehicles having configurable transmitters 50 and 50a, respectively, may operate. Environment 10 includes one or more remote devices 20 that may include, for example, GDOs, security gates, security systems, lights, thermostats, door locks, and appliances. Such remote devices 20 may be accessed through the Internet 30 through a home Internet gateway 35 that is connected via conventional means to the Internet 30. Remote device(s) 20 may connect to home Internet gateway 35 via Bluetooth®, Bluetooth® Low Energy, Wi-Fi, wired Ethernet or a special purpose wireless RF link.

A configurable transmitter 50 installed in a vehicle may communicate directly with remote device 20 by sending an RF signal directly to remote device 20. The remote device(s) 20 can be remotely controlled via the Internet 30 using an Internet-connected mobile device 40, such as a smartphone or in-vehicle Internet connection, for example. The Internet-connected mobile device 40 connects to the Internet 30 through a cellular telephone tower 45 or through other known means such as Wi-Fi. A user interface 70 (FIG. 2) may be installed in the vehicle in association with configurable transmitter 50 that communicates with Internet-connected mobile device 40 to cause Internet-connected mobile device 40 to control remote device 20.

A second configurable transmitter 50a installed in another vehicle may also communicate directly with remote device 20 by sending an RF signal directly to remote device 20. A second Internet-connected mobile device 40a may be provided in association with second configurable transmitter 50a. Alternatively or additionally, second configurable transmitter 50a may communicate with Internet-connected mobile device 40.

An Internet data server 32 may be provided to manage a remote memory device 34 in order to provide cloud storage of channel data (i.e., characteristics of RF signals) that may be used to control remote device(s) 20. As described further below, configurable transmitter 50 or 50a may transfer channel data representing learned RF signal characteristics to server 32 for storage in remote memory device 34 using Internet-connected device 40 or 40a. Further, configurable transmitter 50 or 50a may retrieve channel data representing learned RF signal characteristics from storage in remote memory device 34 using Internet-connected device 40 or 40a. In this manner, once RF signal characteristics have been learned by any one configurable transmitter 50 or 50a and stored in a local memory device 65 (FIG. 2) of the vehicle as channel data, the channel data may be stored in remote storage device 34 for subsequent retrieval by another configurable transmitter 50a or 50 of another vehicle. Thus, the channel data may be effectively transferred from one vehicle to another without requiring the time-consuming training steps of the other configurable transmitter.

The home Internet gateway 35 may serve as a gateway for the Internet-connected device 40 or the configurable transmitter 50 to communicate with other remote devices 20 within a home or other building. Gateway 35 may communicate with these other devices using a variety of communication protocols, such as Bluetooth mesh networking, ZigBee, and/or Z-wave.

Figure 2:
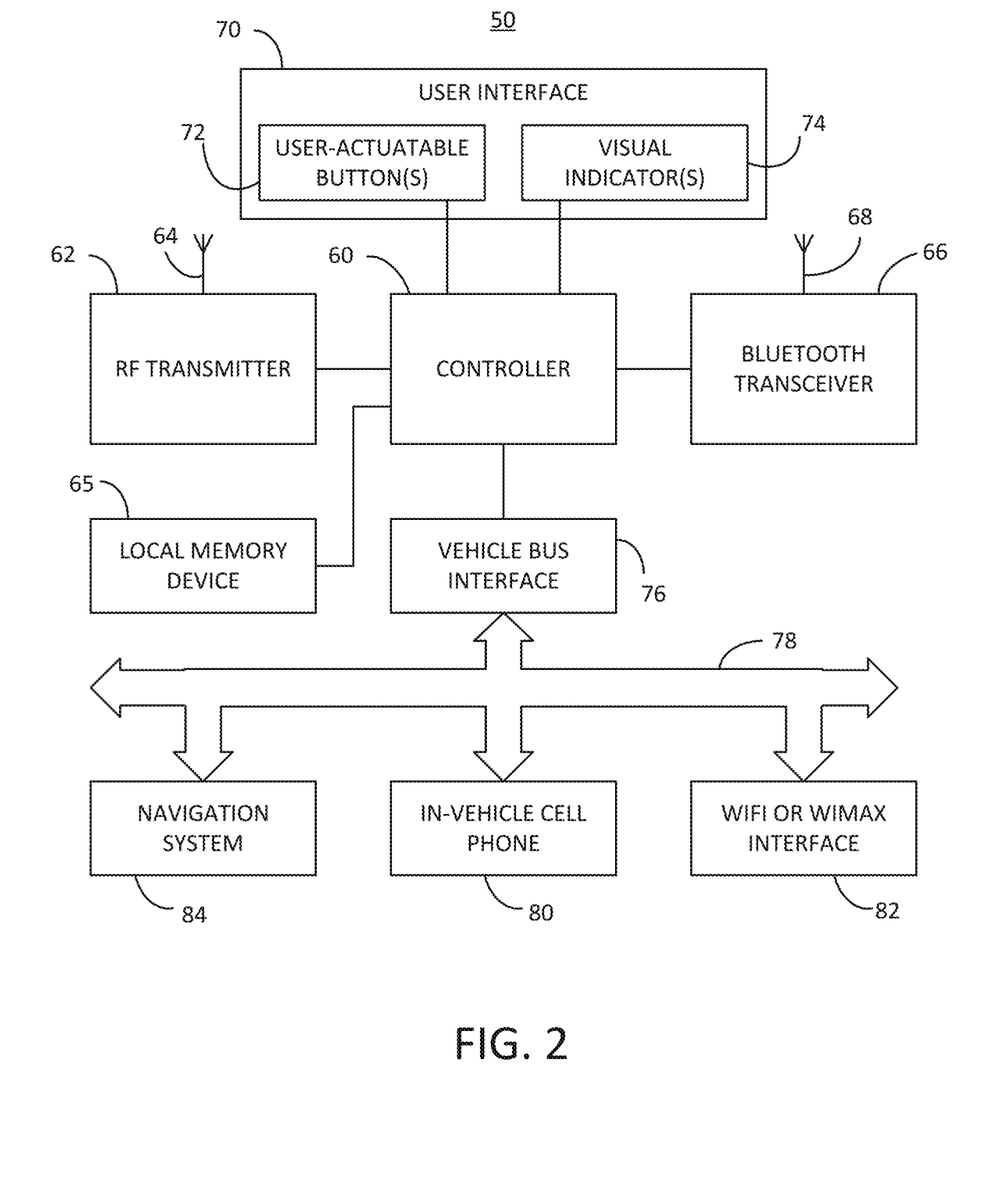
FIG. 2 is a block diagram showing a vehicle configurable transmitter system operable in the environment of FIG. 1.

FIG. 2 shows an example of configurable transmitter 50 that may be used in the environment 10 (FIG. 1). As shown, configurable transmitter 50 may include a controller 60, an RF transmitter 62, a first antenna 64, a local memory device 65, an interface for connecting with an Internet-connected device 40 where the interface is shown in the form of a Bluetooth transceiver 66, a second antenna 68, a user interface 70 including at least one user-actuatable input 72 and at least one visual indicator 74, and a vehicle bus interface 76 connected to a vehicle bus 78. Although shown as separate components, RF transmitter 62 and Bluetooth transceiver 66 may be integrated or partially integrated to share components. Note that the same components shown in FIG. 2 may be used for second configurable transmitter 50a or any other configurable transmitters used in environment 10.

Controller 60 may be a microprocessor programmed to respond to inputs from various components to control RF transmitter 62 to receive and transmit signals using antenna 64 that may be received from or transmitted to a remote device 20. Such inputs may come from user interface 70, a remote device such as a mobile device 40 via Bluetooth transceiver 66, or from various other components connected to vehicle bus 78 via bus interface 76 such as navigation system 84, an in-vehicle cell phone 80, or a Wi-Fi or Wi-Max interface 82.

The construction of RF transmitter 62 and the control thereof by controller 60 are not described in detail herein with the exception of the modifications described below. Details may be found in U.S. Pat. Nos. 5,442,340; 5,479,155; 5,583,485; 5,614,891; 5,619,190; 5,627,529; 5,646,701; 5,661,804; 5,686,903; 5,699,054; 5,699,055; 5,793,300; 5,854,593; 5,903,226; 5,940,000; 6,091,343; 6,965,757; 6,978,126; 7,469,129; 7,786,843; 7,864,070; 7,889,050; 7,911,358; 7,970,446; 8,000,667; 8,049,595; 8,165,527; 8,174,357; 8,531,266; 8,494,449; 8,384,580; 8,264,333; and 8,253,528, the entire disclosures of which are incorporated herein by reference. Before discussing the modifications, an example is provided of one implementation of the configurable transmitter 50.

Figure 3:
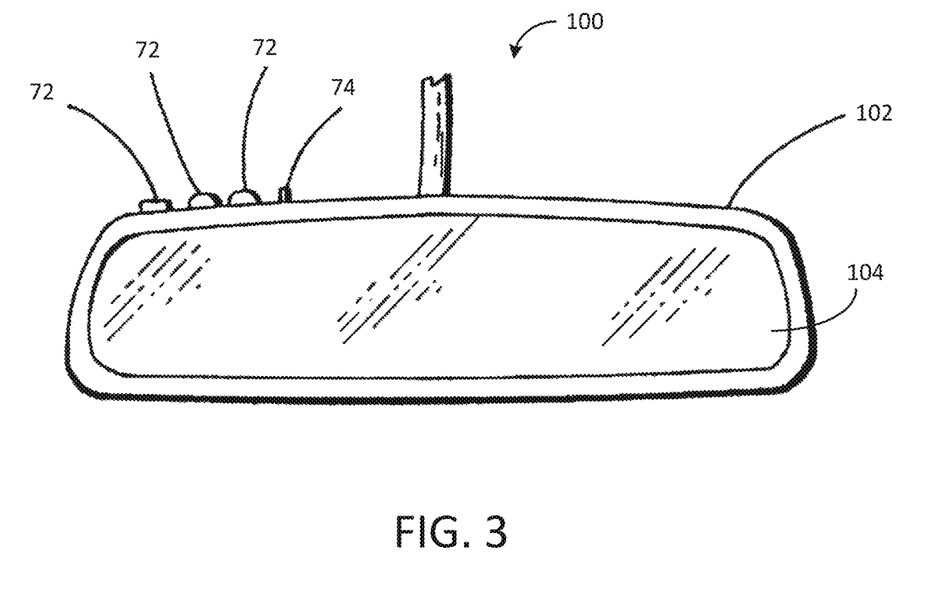
FIG. 3 is a perspective view of a rearview assembly incorporating the vehicle configurable transmitter system of FIG. 2.

FIG. 3 shows an example of a vehicle accessory in the form of a rearview assembly 100 in which configurable transmitter 50 may be incorporated. Although shown in a rearview assembly 100, configurable transmitter 50 could be incorporated into various other vehicle accessories or locations within a vehicle. As shown in FIG. 3, rearview assembly 100 may include a housing 102 for mounting to the vehicle, and a rearview device 104 such as a rearview mirror element, a rearview display or both disposed in housing 102. Rearview assembly 100 may further include at least one user-actuated input 72, such as a push button, capacitive touch sensor, or optical sensor and at least one visual indicator 74 of user interface 70. Visual indicator(s) 74 may take the form of LED indicator lights or may be a display such as disclosed in U.S. Pat. No. 8,643,481, the entire disclosure of which is incorporated herein by reference. The remaining components of configurable transmitter 50 may be housed within housing 102 and are not shown in FIG. 3.

When provided in a rearview assembly 100 where rearview device 104 is an electro-optic mirror element, controller 60 may be configured to read outputs of light sensors (not shown) and control the reflectivity of the electro-optic mirror element. Further, controller 60 may be programmed to control any other components within rearview assembly 100 such as a display, map lights, a compass, an imager, and/or a headlamp control system. Controller 60 may further be programmed to control other vehicle accessories via vehicle bus 78.

Referring back to FIGS. 1 and 2, the ability to allow for transfer of channel data between local memory devices 65 of configurable transmitters 50 and 50a of different vehicles provides for several different use cases. The first pertains to a loaner vehicle where a customer brings their vehicle (having first configurable transmitter 50) to the dealership service and is provided with a loaner vehicle (having second configurable transmitter 50a). The channel data from the first configurable transmitter 50 of a customer's vehicle may be transferred to the second configurable transmitter 50a of the loaner vehicle so that the customer has a usable configurable transmitter 50a without having had to train it.

The second use case is where a customer purchases a new vehicle (having second configurable transmitter 50a). As part of the dealer preparation, the channel data in the first configurable transmitter 50 of a customer's vehicle may be transferred to the second configurable transmitter 50a of the new vehicle.

The third use case is where there are multiple users of a configurable transmitter 50 and different channel data may be loaded in configurable transmitter 50 depending on who is driving the vehicle. In this third use case, channel data is not necessarily transferred between configurable transmitters 50 and 50a of different vehicles, but rather user-specific channel data is downloaded from the cloud (remote memory device 34) depending on who is using the vehicle. Identification of the person using the vehicle may, for example, be made by transmission of a data signal from a remote keyless entry transmitter associated with a particular user.

A fourth use case is where two vehicles access the same garage that has a GDO (remote device 20) that responds to rolling codes. Because some rolling code GDOs maintain a rolling code counter that may be used to activate the GDO, and because the configurable transmitters 50, 50a of two vehicles are sharing a rolling counter, each of the configurable transmitters 50, 50a needs to keep the rolling counters in sync. For example, the configurable transmitter 50 of the first vehicle may have a rolling counter value of X, which means after it activates the GDO, the configurable transmitter 50a of the second vehicle would have to have a rolling counter of X+1, which would ordinarily be difficult to accomplish. However, using the cloud-based system described herein, the channel data including the rolling counter may be uploaded from configurable transmitter 50 to the cloud after each activation and subsequently downloaded from the cloud for use by configurable transmitter 50a and vice versa so that the most recently used rolling counter may be updated to ensure that both configurable transmitters 50 and 50a are transmitting rolling code counters within the acceptance window of the GDO.

To implement the capability of channel data transfer between two configurable transmitters 50 and 50a, different types of channel data may need to be transferred depending upon the type of signal used to activate the remote device(s) 20. For example, the signal may have a fixed code or a rolling code. When a fixed code channel is copied to a second configurable transmitter 50a, that channel data is immediately usable by the second configurable transmitter 50a. There would be no need for the user to press the learn button (if there is one) on the GDO.

When a rolling code channel is transferred to a second configurable transmitter 50a, whether or not the user must press the learn button on the GDO depends on the type of rolling code system and what information is transferred. While not having to press the learn button is convenient, this method has its drawbacks. One drawback is that depending on the rolling code system, there may be security risks, as sensitive data such as encryption keys would have to be transferred to the second configurable transmitter 50*a*. Another drawback is that in use cases where the original configurable transmitter 50 will be used again (e.g., the loaner vehicle use case), the rolling code counter from the second configurable transmitter 50*a* should be transferred back to the original configurable transmitter 50 in order for it to become functional again. Otherwise the original configurable transmitter 50 would be non-functional until the counter "caught up" with the value in the GDO.

Regardless of whether the remote device 20 responds to a fixed or rolling code, certain channel header data will typically be stored in local memory device 65 and thus be subject to transfer. Such channel header data may include type, manufacturer, modulation, frequency, and first level. The channel header data may further include frequency deviation if the signal is frequency modulated. Signal characteristic data incorporated in the channel data may also include pulse timing and pulse sequence in the event a fixed code is used. Other signal characteristic data incorporated in the channel data may include serial number, rolling counter, function code, and any other data necessary to replicate the message.

One concern with the transfer of channel data is that sensitive data such as rolling code keys may have to be transferred between configurable transmitters 50 and 50*a*.

There are two sets of data that may be maintained by the configurable transmitters 50 and 50*a*. One is the trained channel data that is stored in non-volatile memory device 65, and the other is an RC Table that holds the serial numbers and keys to build various rolling code systems. A portion, if not all, of that data may be transferred in order to allow a second configurable transmitter 50*a* to activate the same devices as the first configurable transmitter 50. The specific data that is transferred depends onto which type of system the first configurable transmitter 50 is trained, and whether or not the user should be required to press the learn button on the opener in order for the second configurable transmitter 50*a* to work.

The actual data transfer process could be accomplished by several different methods: (1) a dealership could perform the transfer using a custom device that is possibly Bluetooth-enabled; (2) transfer could be done by the end user with their phone (Internet-connected mobile device 40), again via Bluetooth, where the phone memory serves as the remote memory for storing the channel data; (3) transfer could be done via Internet 30 if the configurable transmitters 50 and 50*a* were connected to the Internet 30 either (a) through vehicle bus 78 and either an in-vehicle cell phone 80 or a Wi-Fi or Wi-Max interface 82 (or other means), or (b) through an interface (such as Bluetooth transceiver 66) and Internet-connected mobile device 40; or (4) the configurable transmitters 50 and 50*a* could communicate with each other directly using RF signals (such as Bluetooth signals).

The mobile device 40 implemented as a smartphone may have an app that allows the user to copy the channel data from configurable transmitter 50 to their mobile device 40. The app would give the user the option of erasing the channel data from the original configurable transmitter 50, which would be preferred in the case where the user wishes to transfer channel data to a second configurable transmitter 50*a* of a new vehicle, or they can keep the original configurable transmitter 50 as is. Even if the transfer is only temporary, such as when using a loaner vehicle, the user may wish to temporarily erase the channel data from the original configurable transmitter 50 for security purposes. The app could even be used to lock out configurable transmitter 50 even when no transfer of data is taking place. This could be useful when valet parking or when leaving the vehicle unattended for an extended period of time, for example, at the airport. The user would then take their mobile device 40 to the new vehicle and transfer one or more channels of data to the configurable transmitter 50*a* of the new vehicle. The app could also be used to move data between channels on a single configurable transmitter 50 such that one may switch between different buttons 72 that may be used to transmit a signal to a particular remote device 20.

In the event that channel data is stored on remote memory device 34, additional security measures may be desired. For example, when registering a user for this particular web service, the server 32 may require entry of the telephone number of the mobile device 40. The server 32 may then cause a text message to be sent to the mobile device 40 while requiring an acknowledgement text in return so as to exchange tokens that are subsequently used to prevent hacking into the server 32. Various known measures such as those used by the banking industry may be used to ensure only authorized users may access the data stored in remote memory device 34. Aside from requiring user verification, the channel data being transferred to/from server 32 may be encrypted. To ensure that a third party cannot intercept and decrypt the transferred channel data, each configurable transmitter 50, 50*a* may encrypt data transferred between itself and server 32 with a unique cloud encryption key as described further below.

A method 200 (FIG. 4) is described herein of transferring channel data from a first vehicle to a second vehicle, where the channel data represents characteristics of an RF signal used to control a remote device 20. The method includes: providing an Internet server 32 configured to store unique configurable transmitter identification codes and cloud encryption keys associated with each unique configurable transmitter identification code (step 202); providing a first configurable transmitter 50 in the first vehicle and a second configurable transmitter 50*a* in the second vehicle (step 204), each of the first and second as transmits RF signals to the remote device, and each configurable transmitter comprises: a local memory device 65 in which a unique configurable transmitter identification code is stored along with a cloud encryption key, a controller 60 coupled to the local memory device 65, the controller 60 configured to store channel data in the local memory device 65, an RF transmitter 62 configured to transmit the RF signal to the remote device 20 in an operating mode where the transmitted RF signal includes the characteristics stored as channel data in the local memory device 65, and an interface 66, 80, 82 through which communication with the Internet server 32 is provided. The method further includes: encrypting the channel data in the local memory device 65 of the first configurable transmitter 50 using the cloud encryption key stored in the local memory device 65 of the first configurable transmitter 50 (step 206); transmitting the unique configurable transmitter identification code of the first configurable transmitter 50 and the encrypted channel data to the Internet server 32 (step 208); storing the encrypted channel data in the Internet server 32, 34 (step 210); transmitting from the second configurable transmitter 50*a* a command to transfer the channel data stored in the Internet server 32 along with the unique identification code of the second configurable transmitter 50*a* (step 212); using the Internet server 32 to look up an encryption key associated with the received unique identification code of the first configurable transmitter 50 (step 214); decrypting the encrypted channel data stored in the Internet server using the encryption key associated with the unique identification code of the first configurable transmitter 50 (step 216); using the Internet server 32 to look up an encryption key associated with the received unique identification code of the second configurable transmitter 50a (step 218); encrypting the channel data stored in the Internet server 32 with the encryption key associated with the unique identification code of the second configurable transmitter 50a (step 220); transmitting the encrypted channel data from the Internet server 32 to the second configurable transmitter 50a (step 222); and storing the received channel data in the local memory device 65 of the second configurable transmitter 50a (step 224).

Figure 4:
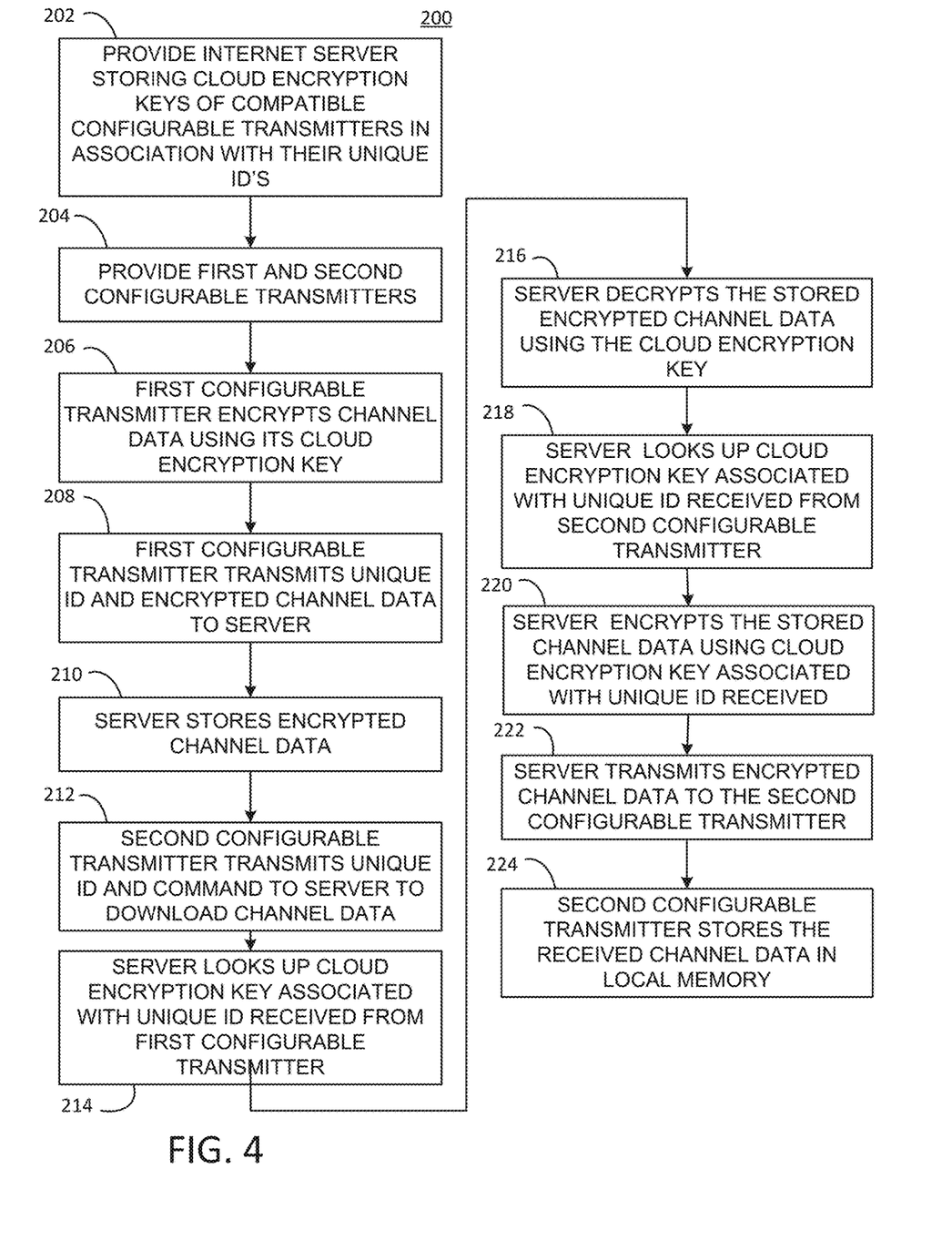
FIG. 4 is a flow chart illustrating a method carried out using the vehicle configurable transmitter system of FIG. 2.

Thus, to execute the method 200, the Internet server 32 stores in memory 34 a table of cloud encryption keys used to encrypt channel data for each configurable transmitter device 50, 50a that is compatible with the system 10 in association with a unique ID for the each compatible configurable transmitter device 50, 50a so that when encrypted channel data is received by the server 32 along with the unique ID, it will know exactly which configurable transmitter 50 sent the encrypted channel data and can retrieve the associated cloud encryption key from storage and decrypt the encrypted data. Similarly, when a command is received by the server 32 to transfer channel data to another configurable transmitter 50a, the configurable transmitter 50a sends its unique ID to the server 32 and the server 32 then can retrieve the encryption key for that configurable transmitter 50a and encrypt and transmit the channel data to the configurable transmitter 50a. It should be noted that this encryption is different from the encryption used for rolling code which encrypts the data in the RF signal sent from the configurable transmitter 50, 50a to the remove device(s) 20.

The channel data stored in memory 34 may be managed using a smartphone app. For example, one may access server 32 using an app on smartphone 40, 40a and send a command to server 32 to transfer channel data stored at the server to a particular configurable transmitter 50a. The app would include the unique ID for the configurable transmitter 50a so that the server 32 may look up the cloud encryption key used by the configurable transmitter 50a as well as an IP address for the configurable transmitter 50a. The server 32 would then transfer the requested channel data to the configurable transmitter 50a. The smartphone app would also allow a user to see all the channel data stored for each memory slot in the local memory device 65 of each configurable transmitter 50, 50a associated with the user's account as stored on server 32. This would allow, for example, a user to switch the channel data associated with the user-actuatable buttons 72 of any one of the configurable transmitters 50, 50a. This avoids the need to re-train the configurable transmitter to re-learn the channel data for another user-actuatable buttons 72.

Although an Internet server 32 is described as being used to store the channel data for purposes of transfer, a dedicated device may instead be used that communicates with the configurable transmitters directly without using the Internet. Such a dedicated device could, for example, be maintained by a dealership.

Further, the server 32 could store more channel data in the cloud for a configurable transmitter 50, 50a than it can store itself in local memory device 65. Then the user may use an Internet-connected device such as their smartphone 40, 40a, to select which channel data should be stored in the local memory device 65 at any particular time. For example, if a first set of channel data is used for home and a second set of channel data is used at a cottage, the user may select the second set of channel data when at the cottage and then select the first set when returning home. Moreover, the app could be configured to use the GPS in the smartphone 40, 40a to automatically select the set of channel data to download to the configurable transmitter 50, 50a if not already downloaded. In this case, the smartphone 40, 40a (or other Internet-connected device), may communicate with the Internet server 32, which would then command a designated configurable transmitter 50, 50a to download the selected channel data from the server 32. Similarly, the smartphone 40, 40a, may be used to cause the Internet server 32 to command a designated configurable transmitter 50, 50a to upload the selected channel data to the server 32.

Although some GDOs are capable of connecting to Wi-Fi and thus may be controlled directly through a smartphone app, not all GDOs have this capability. However, by using a smartphone app on their Internet-connected device 40, one may communicate with the server 32, which may then transmit a command to a configurable transmitter 50, 50a that is parked in or near the garage or to a stand-alone configurable transmitter that may be in or near the garage. Such a command may be to send an RF signal to the GDO to open or close the garage door or to determine the status of whether the garage door is open or closed and return the status information to the smartphone app.

The smartphone app may also allow one to see the frequency included in the channel data and adjust the frequency using the app (or a computer or other Internet-connected device). The channel data with the adjusted frequency may then be downloaded to the configurable transmitter for subsequent transmission of the RF signal.

Garage door opener receivers that operate on a rolling code often have limited memory slots for remote controls. For example, such a receiver may have four memory slots with a first memory slot associated with a first remote control, a second memory slot associated with a second remote control, a third memory slot associated with a first configurable transmitter 50, and a fourth memory slot associated with a second configurable transmitter 50a. Each memory slot is used to store a sequence of expected rolling codes from the associated remote control or configurable transmitter. However, when a new configurable transmitter of a new vehicle is trained and the channel data is deleted from the old configurable transmitter, the memory slot of the GDO receiver associated with the old configurable transmitter is not cleared, and thus the receiver may run out of memory slots to associate with the new configurable transmitter. However, by transferring the channel data from the old configurable transmitter to the new configurable transmitter, the same memory slot of the GDO receiver may be used and the receiver will not know the difference between the RF signals from the old and the new configurable transmitters.

Although the configurable transmitters 50 and 50a are described as being integrated into respective vehicles, they may be handheld devices that may or may not be associated with any particular vehicle. Further, although the embodiments above have described the data to be transferred as channel data, other forms of data that are not tied to a particular channel may be transferred.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A method of transferring channel data from a first vehicle to a second vehicle, where the channel data represents characteristics of an RF signal used to control a remote device, the method comprising:
providing an Internet server configured to store unique configurable transmitter identification codes and cloud encryption keys associated with each unique configurable transmitter identification code;
providing a first configurable transmitter in the first vehicle and a second configurable transmitter in the second vehicle, each of the first and second configurable transmitters transmits RF signals to a remote device, and each configurable transmitter comprises:
a local memory device in which a unique configurable transmitter identification code is stored along with a cloud encryption key,
a controller coupled to the local memory device, the controller configured to store channel data in the local memory device,
an RF transmitter configured to transmit the RF signal to the remote device in an operating mode where the transmitted RF signal includes the characteristics stored as channel data in the local memory device, and
an interface through which communication with the Internet server is provided;
encrypting the channel data in the local memory device of the first configurable transmitter using the cloud encryption key stored in the local memory of the first configurable transmitter;
transmitting the unique configurable transmitter identification code of the first configurable transmitter and the encrypted channel data to the Internet server;
storing the encrypted channel data in the Internet server;
transmitting from the second configurable transmitter a command to transfer the channel data stored in the Internet server along with the unique identification code of the second configurable transmitter;
using the Internet server to look up an encryption key associated with the received unique identification code of the first configurable transmitter;
decrypting the encrypted channel data stored in the Internet server using the encryption key associated with the unique identification code of the first configurable transmitter;
using the Internet server to look up an encryption key associated with the received unique identification code of the second configurable transmitter;
encrypting the channel data stored in the Internet server with the encryption key associated with the unique identification code of the second configurable transmitter;
transmitting the encrypted channel data from the Internet server to the second configurable transmitter; and
storing the received channel data in the local memory device of the second configurable transmitter.

2. The method of claim 1, wherein the channel data is in a form such that the second configurable transmitter may replicate the RF signal without having to receive the RF signal and learn characteristics of the RF signal.

3. The method of claim 1, wherein the step of encrypting the channel data in the local memory device of the first configurable transmitter comprises inputting a command to the controller of the first configurable transmitter to cause the controller to encrypt the channel data from the local memory of the first configurable transmitter.

4. The method of claim 1, wherein the characteristics of the RF signal that are represented in the channel data include channel header data and at least one of the following: pulse timing, pulse sequence, a serial number, a rolling counter, and a function code.

5. The method of claim 4, wherein the channel header data includes type, manufacturer, modulation, and frequency.

6. A configurable transmitter for transmitting signals to a remote device, the configurable transmitter comprising:
an RF transmitter configured to receive an RF signal during a training mode in order to learn characteristics of the received RF signal, and to transmit an RF signal to the remote device in an operating mode where the transmitted RF signal includes the learned characteristics of the received RF signal;
a local memory device for storing channel data representing the learned characteristics of the received RF signal and for storing a unique identification code and a cloud encryption key, wherein the channel data is in a form that may be downloaded though the Internet to another configurable transmitter that can then replicate the received RF signal without having to receive the RF signal and learn the characteristics of the RF signal;
an interface configured to communicate with an Internet server; and
a controller coupled to the local memory device and the interface, the controller configured to retrieve the channel data from the local memory device, to encrypt the channel data using the cloud encryption key and to transfer the encrypted channel data for remote storage in the Internet server through the interface.

7. The configurable transmitter of claim 6, wherein the learned characteristics of the received RF signal include channel header data and at least one of the following: pulse timing, pulse sequence, a serial number, a rolling counter, and a function code.

8. The configurable transmitter of claim 7, wherein the channel header data includes type, manufacturer, modulation, and frequency.

9. The configurable transmitter of claim 6, wherein the controller transfers the encrypted channel data for remote storage in the Internet server in response to a command received from the Internet server.

10. The configurable transmitter of claim 6, wherein the controller transfers the encrypted channel data for remote storage in the Internet server in response to a command received from an Internet-connected device via the Internet server.

11. The configurable transmitter of claim 10, wherein the Internet-connected device is one of a smartphone, a tablet, and a laptop.

12. A configurable transmitter for transmitting signals to a remote device, the configurable transmitter comprising:
a local memory device for storing a unique identification code and a cloud encryption key;
an interface configured to communicate with an Internet server;
a controller coupled to the local memory device and the interface, the controller configured to receive encrypted channel data from the Internet server through the interface, to decrypt the encrypted channel data using the cloud encryption key and to store the channel data in the local memory device, wherein the channel data represents characteristics of an RF signal to which the remote device is responsive;

an RF transmitter configured to transmit an RF signal to the remote device where the transmitted RF signal has the characteristics represented by the channel data, wherein the RF transmitter transmits the RF signal without having to first receive the RF signal and learn the characteristics of the RF signal; and an RF receiver configured to receive the RF signal during a training mode in order to learn the characteristics of the received RF signal, and wherein the controller stores the learned characteristics of the received RF signal as channel data in the local memory device.

13. The configurable transmitter of claim 12, wherein the controller is further configured to retrieve and encrypt the channel data in the local memory device and to transmit the channel data for storage in the Internet server using the interface.

14. The configurable transmitter of claim 12, wherein the characteristics of the RF signal that are represented by the channel data include channel header data and at least one of the following: pulse timing, pulse sequence, a serial number, a rolling counter, and a function code.

15. The configurable transmitter of claim 12, wherein the controller receives the encrypted channel data by downloading the encrypted channel data from the Internet server in response to a command received from the Internet server.

16. The configurable transmitter of claim 12, wherein the controller receives the encrypted channel data by downloading the encrypted channel data from the Internet server in response to a command received from an Internet-connected device via the Internet server.

17. The configurable transmitter of claim 16, wherein the Internet-connected device is one of a smartphone, a tablet, and a laptop.

* * * * *

UNITED STATES PATENT AND TRADEMARK OFFICE
CERTIFICATE OF CORRECTION

PATENT NO. : 11,470,063 B2
APPLICATION NO. : 16/542398
DATED : October 11, 2022
INVENTOR(S) : Witkowski et al.

It is certified that error appears in the above-identified patent and that said Letters Patent is hereby corrected as shown below:

In the Claims

Column 12, Claim 6, Line 26:
"though" should be --through--.

Signed and Sealed this
Eleventh Day of April, 2023

*Katherine Kelly Vidal*

Katherine Kelly Vidal
*Director of the United States Patent and Trademark Office*